United States Patent [19]

Dornan et al.

[11] Patent Number: 5,233,461
[45] Date of Patent: Aug. 3, 1993

[54] METHODS FOR SEALING ELECTROCHROMIC DEVICES AND DEVICES MANUFACTURED THEREBY

[75] Inventors: Craig A. Dornan, Grand Haven; Desaraju V. Varaprasad; Niall R. Lynam, both of Holland, all of Mich.

[73] Assignee: Donnelly Corporation, Holland, Mich.

[21] Appl. No.: 755,636

[22] Filed: Sep. 6, 1991

[51] Int. Cl.$^5$ .............. G02F 1/15; G02F 1/53; G02F 1/1339
[52] U.S. Cl. .................. 359/272; 359/265; 359/273; 359/80
[58] Field of Search ............. 359/265, 272, 274, 273, 359/270, 268, 253, 80

[56] References Cited

U.S. PATENT DOCUMENTS

| 3,280,701 | 10/1966 | Donnelly et al. | |
| 3,282,157 | 11/1966 | Jones et al. | |
| 3,282,158 | 11/1966 | Jones et al. | |
| 3,282,160 | 11/1966 | Jones et al. | |
| 3,283,656 | 11/1966 | Jones et al. | |
| 3,451,741 | 6/1969 | Manos | |
| 3,453,038 | 7/1969 | Kissa et al. | |
| 3,521,941 | 7/1970 | Deb et al. | 350/160 |
| 3,652,149 | 3/1972 | Rogers | 350/160 |
| 3,692,388 | 9/1972 | Hall, Jr. et al. | 350/312 |
| 3,774,988 | 11/1973 | Rogers | 350/150 |
| 3,806,229 | 4/1974 | Schoot et al. | 350/160 |
| 3,854,794 | 12/1974 | Van Dam et al. | 350/160 |
| 3,873,185 | 3/1975 | Rogers | 350/147 |
| 3,879,108 | 4/1975 | Berets | 359/272 |
| 3,912,368 | 10/1975 | Ponjee et al. | 350/160 |
| 3,951,845 | 4/1976 | Cole, Jr. | 252/299 |
| 4,090,782 | 5/1978 | Bredfeldt et al. | 350/357 |
| 4,093,358 | 6/1978 | Shattuck et al. | 350/357 |
| 4,139,234 | 2/1979 | Morgan | 296/84 |
| 4,139,276 | 2/1979 | Clecak et al. | 350/357 |
| 4,210,390 | 7/1980 | Yaguchi | 350/357 |
| 4,227,779 | 10/1980 | Bissar et al. | 359/274 |
| 4,309,082 | 1/1982 | Kohara et al. | 350/357 |
| 4,545,650 | 10/1985 | Kirkman et al. | 359/272 |
| 4,561,001 | 12/1985 | Gunn et al. | 346/218 |
| 4,561,625 | 12/1985 | Weaver | 249/85 |
| 4,684,219 | 8/1987 | Cox et al. | 350/343 |
| 4,712,879 | 12/1987 | Lynam et al. | 350/357 |
| 4,741,603 | 5/1988 | Miyagi et al. | 359/270 |
| 4,750,817 | 6/1988 | Sammells | 350/357 |
| 4,752,119 | 6/1988 | Ueno et al. | 350/357 |
| 4,761,061 | 8/1988 | Nishiyama et al. | 350/357 |
| 4,795,242 | 1/1989 | Wudl et al. | 350/357 |
| 4,893,908 | 1/1990 | Wolf et al. | 350/357 |
| 4,902,108 | 2/1990 | Byker | 350/357 |
| 5,073,012 | 12/1991 | Lynam | 359/265 |
| 5,115,346 | 5/1992 | Lynam | 359/265 |
| 5,140,455 | 8/1992 | Varaprasad et al. | 359/275 |
| 5,142,407 | 8/1992 | Varaprasad et al. | 359/276 |
| 5,151,816 | 9/1992 | Varaprasad et al. | 359/275 |

FOREIGN PATENT DOCUMENTS

A6804290 2/1991 Australia .
0012419 6/1980 European Pat. Off. .

(List continued on next page.)

OTHER PUBLICATIONS

I. F. Chang, "Electrochromic and Electrochemichromic Materials and Phenomena", *Nonemissive Elec-*

(List continued on next page.)

Primary Examiner—Bruce Y. Arnold
Assistant Examiner—Evelyn A. Lester
Attorney, Agent, or Firm—Fitzpatrick, Cella, Harper & Scinto

[57] ABSTRACT

The method for sealing electrochromic devices disclosed in the present invention allows the cell cavity of a device to be established and filled with media at substantially the same time, without requiring spacer beads, fill holes and the like to complete the assembly. Moreover, the method of the present invention allows the cell cavity to be filled without accurately pre-measuring the media. Further, the sealing means used herein is constructed of a thermoplastic material that is inert to, and compatible with, the media commonly used and which forms an integral seal, even while in intimate contact with the media in the cell cavity.

45 Claims, 2 Drawing Sheets

FOREIGN PATENT DOCUMENTS

| | | |
|---|---|---|
| 0240226 | 10/1987 | European Pat. Off. |
| 0430684 | 6/1991 | European Pat. Off. |
| 56-93742 | 12/1982 | Japan |
| 56-93743 | 12/1982 | Japan |
| 566863 | 8/1977 | U.S.S.R. |
| 328017 | 5/1930 | United Kingdom |
| 1314049 | 4/1973 | United Kingdom |

OTHER PUBLICATIONS

*trooptic Displays*, 155-96, A. R. Kmetz and F. K. von Willisen, eds., Plenum Press, New York (1976).

C. M. Lampert, "Electrochromic Materials and Devices for Energy Efficient Windows", Solar Energy Materials, 11, 1-27 (1984).

N. R. Lynam, "Electrochromic Automotive Day-/Night Mirrors", *SAE Technical Paper Series*, 870636, Society for Automotive Engineers (1987) (SAE Paper I).

N. R. Lynam, "Smart Windows for Automobiles", *SAE Technical Paper Series*, 900419, Society for Automotive Engineers (1990) (SAE Paper II).

N. R. Lynam and A. Agrawal, "Automotive Applications of Chromogenic Materials", *Large Area Chromogenics: Materials and Devices for Transmittance Control, SPIE Institute Series*, IS 4, 46-84, C. M. Lampert and C. G. Granquist, eds., SPIE Optical Engineering Press, Washington (1990).

I. V. Shelepin et al., "Electrochromism of Organic Compounds I. Electrochemical and Spectral Properties of a System Based on Methylviologen and 3-Ethyl-2-Benzothiazolone", *Electrokhimya, 13(1), 32-37 (Jan. 1977)* (Shelepin I).

I. V. Shelepin et al., "Electrochromism of Organic Compounds II. Spectral and Electrochemical Examination of a System Based on Methylviologen and 5,10-Dihydro-5,10-Dimethylphenazine", *Electrokhimya*, 13(3), 404-08 (Mar. 1977) (Shelepin II).

I. V. Shelepin et al., "Electrochromism of Organic Compounds II. Spectral and Electrochemical Study of a System Based on Methylviologen and 5,10-Dihydro-5,10-Dimethylphenazine", *Chem. Abs.*, 86:196871c, 72-Electrochemistry (1977) (Shelepin III).

O. A. Ushakov et al., "Electrochromism of Organic Compounds. Some Properties of Two-Electrode Cells", *Electrokhimya*, 14(2), 319-22 (Feb. 1978).

METHODS FOR SEALING ELECTROCHROMIC DEVICES AND DEVICES MANUFACTURED THEREBY

BACKGROUND OF THE INVENTION

1. Technical Field of the Invention

The present invention relates to methods for sealing electrochromic devices and devices manufactured thereby. Specifically, these methods are well-suited for manufacturing electrochromic devices—including electrochemichromic devices—in which electrochromic media—including electrochemichromic solutions—is placed in the cell cavity created therein. These devices are capable of varying the amount of light transmitted therethrough when an applied potential is introduced thereto. In that regard, the present invention relates to methods for sealing such devices which engage a sealing means to enclose the periphery of the cell cavity which has been created from the combination of at least two transparent substrates with the sealing means positioned therebetween. In this manner, the media may be contained within the cell cavity. Such sealing means hermetically seal the media within the device so that it is prevented from escaping therefrom and is also shielded from the external environment.

2. Brief Description of the Prior Art

Devices employing electrochromic and electrochemichromic technology are known [see, e.g. N.R. Lynam, "Electrochromic Automotive Day/Night Mirrors", *SAE Technical Paper Series*, 870636 (1987) ("SAE Paper I"), N.R. Lynam, "Smart Windows for Automobiles", *SAE Technical Paper Series*, 900419 (1990) ("SAE Paper II") and N.R. Lynam and A. Agrawal, "Automotive Applications of Chromogenic Materials", *Large Area Chromogenics: Materials & Devices for Transmittance Control*, C.M. Lampert and C.G. Granquist, eds., Optical Engineering Press, Washington (1990)]. Specifically, in connection with the manufacture of electrochromic devices and the technology engaged in the same, see U.S. Pat. Nos. 3,521,941 (Deb) and 4,712,879 (Lynam), and C.M. Lampert, *Solar Energy Materials*, 11, 1 (1984). And, in connection with the manufacture of electrochemichromic devices and the technology employed for the same, see U.S. Pat. Nos. 3,280,701 (Donnelly); 3,282,157 (Jones); 3,282,158 (Jones); 3,282,160 (Jones); 3,283,656 (Jones); 3,451,741 (Manos); 3,453,038 (Kissa); 3,806,229 (Schoot) and 4,902,108 (Byker). Despite this knowledge, those of ordinary skill in the art have been faced with the problem of efficiently incorporating these technologies into the manufacture of commercial devices.

Briefly, in the manufacture of these devices, glass substrates are typically positioned in spaced-apart relationship to one another and are separated by a seal which is placed on the periphery thereof which, when viewed in combination, creates a cavity in which the media is placed. The seal not only provides a means of ensuring the integrity of the cell which prevents media from escaping therefrom, but also assists to prevent the electrodes or conductive coatings (located on the interior faces of each of the glass substrates) from contacting one another and thus decreases the chance of short-circuiting the system.

The seals employed heretofore have often been constructed from an epoxy resin with a hardening agent combined therewith. Spacer beads of substantially uniform dimension—e.g., glass beads having a diameter of about 150 $\mu$m—have also often been positioned on the interior face of a first substrate to assist in keeping the substrates distanced in their spaced-apart relationship when positioned together.

The epoxy resins have typically been applied to these substrates with a silk-screening instrument so that a thickness of about that of the spacer beads is obtained. After pre-curing the epoxy resin so that it reaches a semi-hardened state, a second substrate is positioned over the first substrate, and the two substrates subsequently pressed together so that the epoxy resin forms a continuous seal about the periphery thereof. The substrates are then held together under pressure, and the assembly generally fired in an oven, to fully cure the epoxy seal.

The epoxy resins, which are thermosetting materials, are provided initially, by their very nature, in an uncured state. Thus, because these materials have insufficient physical strength to secure the two substrates together in their uncured form, the seal needs to be cured prior to dispensing media into the interpane cell cavity. This is particularly true for media that comprises electrochemically active compounds dissolved in organic solvents since organic solvents may hinder the curing of the epoxy resins into seals. And, the electrochemically active compounds may be degraded when contacted with the components commonly used in the formation of seals from thermosetting materials. For these reasons, it has been the convention to fully establish and cure the seal prior to—rather than concurrently with—filling the interpane cell cavity so established with electrochromic media.

To that end, in one conventional method for filling such a device, the media is introduced into the interpane cavity by a small gap—e.g., less than 1 mm ×1 mm ×150 $\mu$m—which is allowed to remain in the seal of the device during assembly. Typically, this gap is located at a corner thereof and acts as a "fill hole". Due to the fact that typically there is only one hole, which is itself small, filling the cell cavity is often difficult because of the back pressure created from within.

In another conventional method, known as the vacuum backfill technique, the empty device is placed in a vacuum chamber along with a container—e.g., a dish or small cup—of the media intended to be placed in the cell cavity through the fill hole. This chamber is generally evacuated under a vacuum of about 1 mm Hg or lower and the fill hole is then lowered into the container, just beneath the surface of the media. The chamber is then vented to atmospheric pressure—i.e., using nitrogen or some other inert gas—and the media forced into the cell cavity of the device until it is filled. Once filled, the fill hole is plugged and itself sealed in a secondary operation. In practice, such fill holes have proven to be weak points in the overall integrity of the sealed device. And, this technique is somewhat limited by the size and shape of the device to be filled.

Generally, when filled by any of these methods, a cosmetically unacceptable gaseous bubble may form and thereafter remain within the cell cavity of the device. While a small bubble of about 1 mm diameter will often dissolve over time, a larger bubble will not typically completely disappear. The choice of media solvent will often affect the formation and size of the bubble after vacuum backfilling a given device. In that regard, it is difficult to fill the device at room temperature with a highly viscous media—i.e., a gel or semi-solid media. Thus, in order to render the media less viscous, elevated filling temperatures are resorted to in an effort to render the media more fluid. This may cause degradation of the constituents of the media over prolonged periods of time as well as encourage the residual bubble to become even larger. The undesirability of these methods therefore becomes even more resounding.

U.S. Pat. No. 4,761,061 (Nishiyama) describes a further method of manufacturing these devices. There, two or more inner banks are constructed from pre-cured sealing materials and are thereafter placed at the periphery of the substrate of such a device. The inner banks are positioned between an uncured outer bank and the media which is ultimately to be placed within a cavity so formed. The purported purpose of the inner banks is to prevent the media from contacting the as yet uncured outer bank by retaining it between the inner banks. This function reportedly prevents the degradation of any electrochemically active compound present in the media. Because of the precision required in measuring the amount of material necessary to form the inner banks and the outer bank, the time required to pre-cure the inner banks and the positioning required with respect to the space interval between the inner banks and the outer bank, the inefficiency of this method is clear. Inasmuch as this method also requires precise measuring of media to fill, but not overflow, the cavity thereby formed, its inefficiency is compounded.

Thus, to date, the available methods for sealing media within the cell cavity of electrochromic devices have proven cumbersome as well as inefficient and often ineffective, and particularly so for devices having large surface area, such as automobile glazings. In view of these shortcomings, it would be desirable to provide a method for sealing such devices that creates the cell cavity at substantially the same time as the media is dispensed. In this way, the sealing material would need not be cured separately prior to dispensing the media and establishing the seal. This method should also allow the media to be dispensed without having to accurately pre-measure it. In addition, such a sealing method should keep the substrates in spaced-apart relationship to one another as a result of the seal itself (not spacer beads having been added thereto) which also keeps the devices themselves intact so that the opportunity for short circuiting is decreased.

Therefore, a definite need exists for a method for sealing electrochromic devices wherein the cell cavity is created at substantially the same time as when the media is dispensed and the seal itself forms, and wherein the media is readily dispensed without requiring precise measurement thereof.

SUMMARY OF THE INVENTION

Accordingly, it is an object of the present invention to provide methods for efficiently sealing electrochromic devices. In this connection, such methods provided by the instant teaching create the cell cavity of these devices at substantially the same time as the media is dispensed so that the sealing material does not need to be cured separately prior to dispensing the media and establishing the seal. These methods provided herein also allow the media to be dispensed without accurately pre-measuring it. In addition, these methods keep the substrates in spaced-apart relationship to one another as a result of the seal itself (not spacer beads having been added thereto) which also keeps the devices themselves intact so that the risk of short circuiting is decreased.

The sealing materials employed in such methods are compatible with, and inert to, the solvents commonly used in electrochromic media. The sealing materials are also capable of forming an integral seal without gaps or holes, even while in intimate contact with the media contained in the interpane cell cavity. Moreover, the sealing materials are capable of adhering to the substrates of such devices, especially in the presence of the solvent of the media.

The present invention solves the aforementioned shortcomings by providing efficient methods for sealing electrochromic devices that create and fill the cell cavity with media at substantially the same time without having to accurately pre-measure the media or, for that matter, the sealing material and without having to pre-cure or harden the sealing material prior to dispensing the media. And, the present teaching renders commercially viable the manufacture of devices having large surface area.

More specifically, the methods for sealing the cell cavity of these devices generally comprise the steps of initially positioning a sealing material onto the interior face of a first substrate; dispensing media onto the first substrate which has the sealing material position thereon; positioning a second substrate in spaced-apart relationship with the first substrate such that the sealing material and media are located therebetween; applying pressure to the first and second substrates such that the substrates are pressed toward one another and the media located therebetween is displaced throughout the cell cavity; and heating, under pressure, the assembly which is formed to a temperature that is sufficient to soften the sealing material and thereafter harden the sealing material into a seal which keeps the integrity of the device intact.

In a particular embodiment of the present invention, the method for sealing the cell includes the steps of positioning a sheet of thermoplastic material onto the interior face of a first glass substrate; trimming the sealing material to size about the periphery of the first glass substrate; trimming the interior of the sealing material so that only a border of the material remains toward, but recessed from, the periphery of the first glass substrate; dispensing media onto the first glass substrate without precisely measuring the amount needed to fill the cavity; positioning a second glass substrate in a spaced-apart relationship with the first glass substrate such that the media and the trimmed thermoplastic material are positioned between the substrates thereby creating a cell cavity; applying pressure onto the substrates so that, as they are pressed together, the media is displaced throughout the cell cavity and any excess media underflows or overflows the trimmed thermoplastic material; and heating this assembly, while still under a pressure, so that the thermoplastic material softens and adheres to the substrates and thereafter hardens into the sealing material to seal the cell.

The devices manufactured by the methods of the present invention may be adapted to function as mirrors—e.g., vehicular, architectural or specialty mirrors, such as those useful in periscopic or dental applications. Alternatively, with the reflective coating omitted therefrom, it is clear that the devices so formed are equally well-suited for window assemblies, such as architectural or automotive glazings like sun roofs, sun visors or shade bands as well. In addition, privacy or security partitions, information displays, optically attenuating contrast filters, lenses and the like may also be manufactured by the methods of the present invention.

It is to be understood that both the foregoing general description and the following detailed description are exemplary and explanatory only and are not intended to limit the scope of the invention as claimed. It is the intent of the accompanying drawings together with the detailed description which follows to serve to explain the principles of the present invention thereby enabling those of ordinary skill in the art to practice the teaching without undue experimentation.

BRIEF DESCRIPTION OF THE DRAWINGS

The depictions in these figures are for illustrative purposes and thus are not drawn to scale.

DETAILED DESCRIPTION OF THE INVENTION

In accordance with the present invention, the method for sealing devices described herein may be employed with not only electrochromic functioning devices, but with any assembly having at least two substantially planar substrates that are placed in spaced-apart relationship regardless of whether a substantially fluid material is placed therebetween.

More specifically, these methods are applicable to any assembly known to vary the amount of light transmitted therethrough, such as liquid crystal, thermochromic, photochromic, electrochromic or electrochemichromic devices. However, the methods of the present invention are especially well-suited for use with electrochromic and electrochemichromic devices. For the sake of brevity, a description of electrochromic and electrochemichromic technology may be gleaned from the following non-exhaustive list of documents: U.S. Pat. Nos. 3,280,701 (Donnelly) and 3,451,741 (Manos), respectively, and *Non-emissive Electrooptic Displays*, A.R. Kmetz and F.K. von Willisen, eds., Plenum Press, New York (1976), whose teachings are herein specifically incorporated by reference.

Reference will now be made to the figures in order to illustrate the benefits derived from the instant teaching. It can be seen from FIG. 1 that the electrochromic cell 1 includes two substantially transparent planar substrates 2,3 positioned substantially parallel to one another. The substrates 2,3 should be positioned in spaced-apart relationship, and displaced in opposite directions relative to one another, with a sealing means 5 located therebetween to define the cell cavity. The substrates 2,3 should be positioned as close to parallel to one another as possible such that the phenomenon known as "double imaging" may be avoided. This phenomena is particularly noticeable in mirrors when the electrochemical components thereof have been influenced to their colored states.

Figure 1:
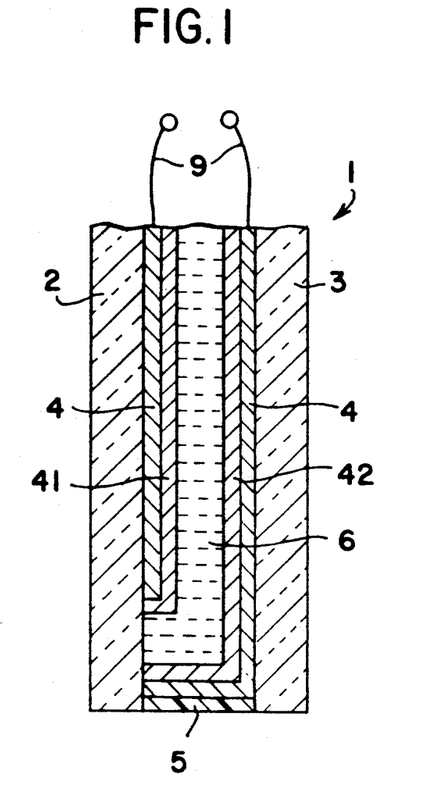
FIG. 1 depicts a sectional view of an electrochromic device wherein the sealing means is set forth.

The substrates 2,3 may be constructed of any material which provides a rigid support for the device as a whole, such as panels, which may be substantially planar, curved or bent, which are constructed from glass, optical plastics, such as polycarbonate, acrylic and polystyrene, tempered glass or laminated glass. While the term "glass" is often employed in the instant disclosure, it is intended by the teaching herein that that term also include those materials just recited. To that end, the substrates 2,3 may each be constructed of the same material or different materials from these listed herein. And, the substrates 2,3 are preferably each of substantially the same size and geometric dimensions.

The interior faces of the substrates 2,3 may each be coated with a conductive coating 4 constructed of any of a host of materials known in the art, such as indium tin oxide (ITO), tin oxides, such as fluorine or antimony doped tin oxides, and the like. In addition, an electrode coating 41, such as a working electrode constructed of a thin film of a cathodic material, like $WO_3$, and an electrode coating 42, such as a counter electrode, may also be found set forth over the conductive coatings 4 which are on the interior faces of the substrates 2,3, respectively, and thus are in intimate contact with the media 6 [for a description of suitable electrode coatings, see SAE Paper I].

Figure 2:
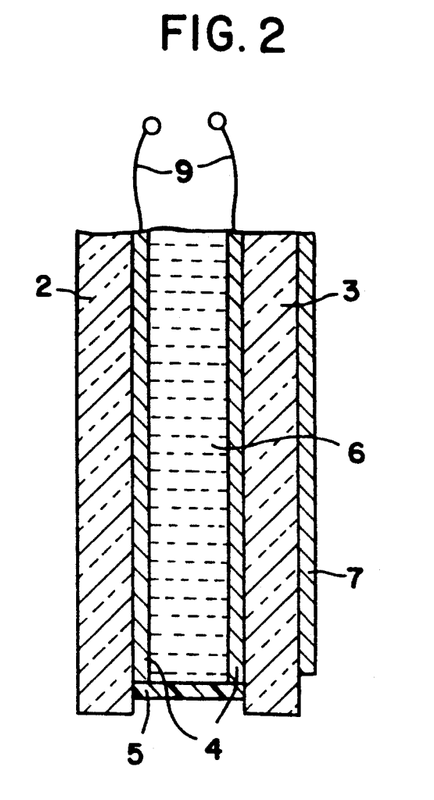
FIG. 2 depicts a sectional view of an electrochemichromic device wherein the sealing means is set forth.
Figure 3:
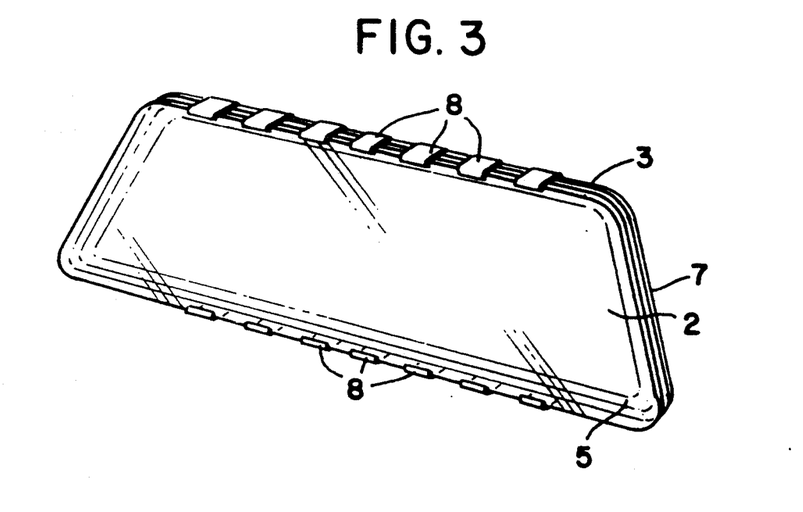
FIG. 3 depicts a perspective view of an electrochemichromic mirror.

Referring now to FIGS. 2 and 3, wherein electrochemichromic devices are generally illustrated, the substrates 2,3 are similarly arranged with a conductive coating 4 thereon. This coating 4 may also be constructed from any of the materials stated above in connection with conductive coatings. However, in contrast to electrochromic devices wherein it is the electrode coatings 41 and 42 that color, with electrochemichromic devices it is the constituents of the electrochemichromic solution 6—i.e., the anodic compounds and cathodic compounds—that cause the color when the cell is appropriately influenced by an applied potential.

In order to create the cell cavity of the devices discussed herein, reference is made to FIGS. 4A through 4E to illustrate the method of the present invention. The method calls for positioning substrate 2 (either coated with a conductive coating 4 or a conductive coating 4 and an electrode coating 41 thereover) onto a work place, preferably under an inert atmosphere, and thereafter placing a sheet of thermoplastic material 5a (so designated at this stage of the method) onto the interior face of the substrate 2 (see FIGS. 4A and 4B). This sheet of thermoplastic material 5b (so designated at this stage of the method) may then be trimmed to size about the outer periphery of the substrate 2 after it has been placed thereover, taking care that it is slightly inward from the peripheral edge of the substrate 2 (see FIG. 4C). Next, the interior portion of the thermoplastic sheet 5c (so designated at this stage of the method) may be trimmed so that only a border of this sheet remains about the periphery of the substrate 2 (see FIG. 4D). This border need not be of any particular width keeping in mind that the larger the border, the smaller the surface area of the face of the functional device. To that end, a smaller border of trimmed thermoplastic material 5c is preferred.

Figure 4A:
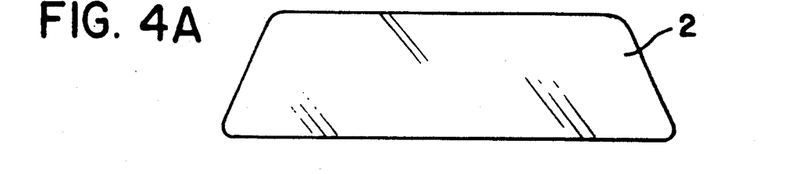
FIGS. 4A through 4E depict a schematic flow diagram of a method for sealing devices, such as a mirror, according to the present invention.
Figure 4B:
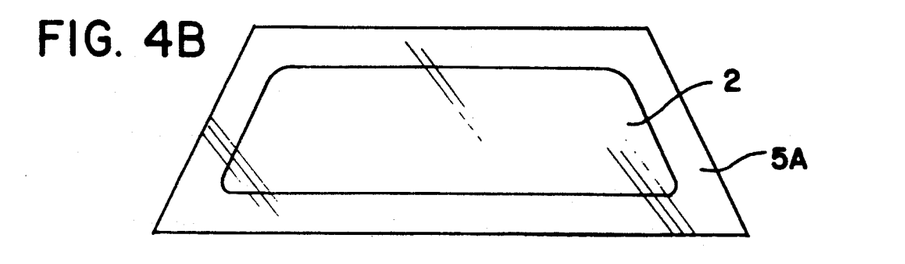
Figure 4C:
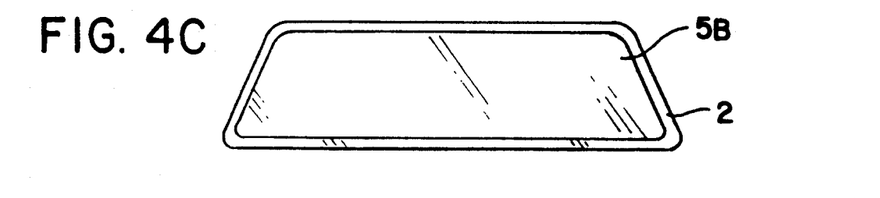
Figure 4D:
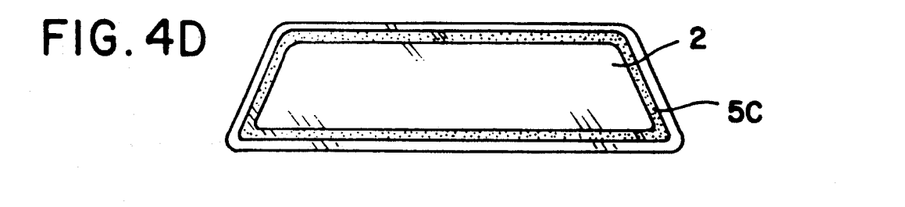

Thus, before the media 6 is dispensed onto the substrate 2, the trimmed thermoplastic material 5c, which will form the sealing means 5 once the method of the present invention is completed, is positioned about the periphery of the interior face of the substrate 2 (see FIG. 4D). It is typically preferable to at least partially soften the thermoplastic material prior to use so as to facilitate the seal formation between the substrates 2,3.

The thermoplastic material may be used as an integral frame or border that will fit about the periphery of the substrate 2 to create a peripheral border of the thermoplastic material therearound. The material employed may also be silk-screened, extruded, cut into one or more pieces, such as strips, or sprayed or coated onto the substrate 2. Alternatively, the material (in whichever form) may also be laid toward the periphery of substrates 2,3 and, at least as to the substrate 2, be affixed thereto prior to dispensing the media 6 thereon.

Optionally, adhesion promoters, that are inert to the media 6, may also be either added to the thermoplastic material or coated onto the inwardly facing ITO-coated peripheral surfaces of substrates 2,3 to assist in keeping the integrity of the resulting assembly intact.

The thermoplastic material used to form sealing means 5 may be constructed from many materials that soften or melt at a temperature sufficiently high such that the sealing means 5 retains its integrity at the operating temperatures of the device. On the other hand, this temperature should not be so high that the media 6, which is in contact therewith in the cavity so formed, becomes physically altered or chemically degraded. In that regard, a temperature in the range of about 50° C. to about 200° C. is preferred, with a temperature of about 75° C. to about 150° C. being most preferred. The sealing means 5 should also be inert to the media 6 and any by-products of the constituents thereof which may form during operation.

The thermoplastic material employed should itself have a thickness of about 0.01 mm to about 1 mm when it is positioned on the substrate 2. Suitable thermoplastic materials are economically commercially supplied with a uniform thickness already pre-established. A variety of conventional means are available to establish a uniform thickness for thermoplastic materials, including, but not limited to, passage of the thermoplastic material between heated rollers with a precisely defined and uniform inter-roller spacing. Alternatively, the thermoplastic material may be dissolved in a suitable low boiling solvent, and thereafter cast onto a flat surface such that, upon evaporation of the solvent, a uniform thickness is established.

The thickness of the resulting sealing means 5 is commonly much less and is a function of the temperature, pressure and time upon which the substrates are acted upon during assembly of the device. A thickness of about 10 $\mu$m to about 1000 $\mu$m is suitable, with about 50 $\mu$m to about 500 $\mu$m being preferred. It is this thickness of the resulting sealing means 5 which determines the distance between the spaced-apart substrates 2,3—i.e., the cell gap. Since this interpane cell gap is established by the thickness of the thermoplastic material itself, the resulting seal need not contain a hard, granular bead-containing spacer material to ensure that a certain cell gap distance between the substrates 2,3 be established. That is not to say, however, that spacer beads may not also be employed in connection with the thermoplastic material to establish a seal.

It is noteworthy that thermoplastic materials are preferred over thermosetting materials because constituents of thermosetting materials need first be reacted together in order to create a material capable of establishing a seal. That is, thermosetting materials require a curing time prior to contacting the media therewith so that a material with sufficient physical strength to support the substrates 2,3 and thereafter seal the media 6 within the cell cavity may be created. Also, the individual constituents that comprise the thermosetting materials are unlikely to remain inert to the constituents of the media 6. It is for these reasons that thermoplastic materials are preferred over thermosetting materials, and are thus chosen for the present invention.

In that regard, a sealing means 5 may be selected from a class of materials including, but not limited to, thermoplastic materials such as polyvinyl butyral, ethylene:organic acid copolymers and salts thereof, ethylene vinyl alcohol, ethylene vinyl acetate, polyolefins, polyesters, polystyrene, polyvinyl chloride, ethylene ethyl acrylate, polyvinylidene chloride, ethylene acrylate, nylon, polycarbonate, polyethylene fluoride, ionomer resins and any combination thereof. Specifically, the thermoplastic material may be an ethylene:organic acid copolymer selected from the group consisting of ethylene:methacrylic acid copolymer and salts thereof, ethylene:acrylic acid copolymer and salts thereof and any combination thereof. And, those salts noted above are preferably selected from the group consisting of lithium, sodium, potassium, zinc and any combination thereof. Preferably, the sealing means is a plasticized polyvinyl butyral (using plasticizers, such as triethylene glycol dihexoate, butyl benzyl phthalate, dibutyl sebacate, tetraethylene glycol di-n-heptanoate and the like) or an ionomer resin available commercially under the respective trade names "SAFLEX" [Monsanto Co., St. Louis, Missouri] and "SURLYN" [Du Pont Co., Wilmington, Delaware].

In addition, and particularly for devices wherein substrates 2,3 are of large surface area and of compound curvature—e.g., vehicular glazings where the glazing surface areas are about 0.1 m$^2$ to about 2 m$^2$ and where compound curvatures are common—, it is preferred that the thermoplastic material selected for the seal have a moderate to low modulus of elasticity. In that regard, a moderate modulus of elasticity may be in the range of about 10,000 PSI to about 250,000 PSI. However, for large surface areas with a compound curvature, a modulus of elasticity of less than about 1,000 PSI is preferred to facilitate the sealing of the substrates 2,3, especially where any curvature is present in the substrates 2,3.

To ensure the environmental and ultraviolet stability of the sealing means, and to ensure its processability, such thermoplastic materials may be compounded with ultraviolet stabilizing agents, anti-oxidants, internal lubricants and the like. However, care should be taken in selecting such additives so that their presence does not lead to physical, chemical or electrochemical degradation or contamination of the media. Such thermoplastic materials should be chosen such that they are substantially electrically non-conducting so that the resulting sealing means 5 does not act as an electrical short between the substrates of the device.

Optionally, dyes, pigments, colorants, fillers or opacifying agents may further be added to the thermoplastic material in order to color match the sealing means 5 to any surrounding bezel or encapsulation means which may be present on the completed device.

Before transforming the trimmed thermoplastic material 5c into sealing means 5, media 6 may be dispensed onto the substrate 2. Care as to precise amounts of media 6 need not be taken, although, preferably, the media 6 should not be dispensed so freely that unnecessary media waste occurs. Inasmuch as the media 6 may be in the liquid, gel or semi-solid form, the media 6 may be dispensed in various ways. In the liquid form, the media 6 may simply be dispensed onto the substrate 2 bearing the trimmed thermoplastic material 5c without accurately pre-measuring it.

Figure 4E:
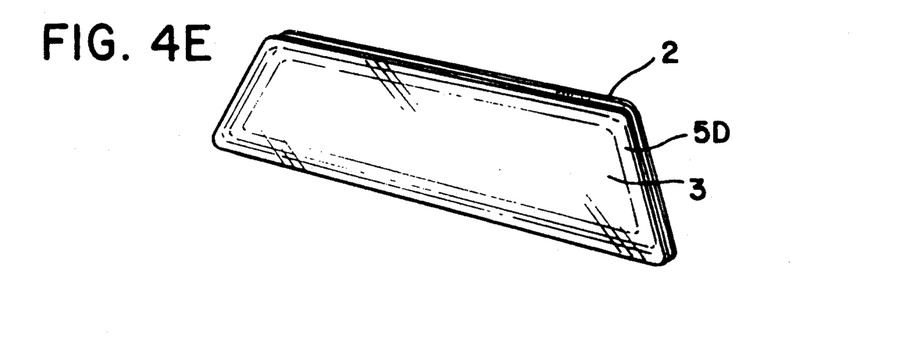

That a portion of the liquid media 6 should escape under or over the trimmed thermoplastic material 5c is of no moment, because the substrate 3 may then be placed in contact with the trimmed thermoplastic material 5d (so designated at this stage of the method in FIG. 4E). In this way, the cell cavity becomes filled with the media 6 and any excess media 6 displaced from the cell cavity by the pressure applied to, and by, substrates 2,3 on the trimmed thermoplastic material 5d positioned therebetween. And, surprisingly, even with the presence of residual media 6 over or under the trimmed thermoplastic material 5c, the trimmed thermoplastic material 5c will adhere to the substrates 2,3 once pressure and heat are applied.

In an additional mode of the present invention, the trimmed thermoplastic material 5c may be affixed onto substrate 3. The media 6 may then be dispensed onto substrate 2, provided that it is sufficiently viscous to substantially remain thereon. The substrates 2,3 may then be pressed together to fill the cavity and displace excess media 6 therefrom as above.

In another additional mode, a feed tube may be placed on the trimmed thermoplastic material 5c once it has been positioned on the substrate 2. Substrate 3 may thereafter be pressed against substrate 2 so that pressure is applied inwardly toward the trimmed thermoplastic material 5d. Once heat and pressure are applied to this assembly, media 6 may be dispensed through the feed tube into the cavity created within the assembly. Upon filling the cavity, the feed tube may be removed and the trimmed thermoplastic material 5d hardened to form sealing means 5. Since sealing means 5 is constructed from a thermoplastic material, under the pressure and heat applied thereto, the material may readily be induced to form an integral seal.

In yet another mode, the trimmed thermoplastic material may be placed on the interior face of each of the substrates 2,3 and, at least as to one of the substrates 2,3, affixed thereto. The media 6 may then be dispensed onto substrate 2 and the method performed as described above.

Although, in any of these modes, it is unnecessary to accurately pre-measure the media 6 to be employed in the device ultimately constructed, a quantity should be employed that is at least equal to, and typically greater than, the initial volume of the cell cavity formed by the substrates 2,3 and the interior lateral edges of the trimmed thermoplastic material 5d. To that end, the media 6 may be dispensed into the cell cavity by means of a feeding device or dispenser. Once dispensed, the media 6 may be spread over the interior surface of the substrate 2, as enclosed by the lateral edges of the trimmed thermoplastic material 5c, using substrate 3 itself taking care not to entrain gaseous bubbles therein in the process. Alternatively, a printing method, a transfer method, a knife-coating method, or any conventionally known method may be employed to achieve media displacement within the cell cavity [see, e.g. U.S. Pat. No. 4,761,061 (Nishiyama)]. The viscosity of such media 6 should desirably be in the range of about 500 cps to about 50,000 cps. And, the viscosity thereof may be readily adjusted by heating, cooling, or diluting the media 6 with additional solvent. To the extent that either or both of media 6 and substrate 2 may be heated prior to and, additionally, or alternatively, during the dispensing of very viscous media, such as that found in connection with polymer thickened electrochemichromic solutions, due care should be taken to select a temperature that will avoid degradation of media 6, sealing means 5 and, possibly, the conductive coating 4 on substrate 2. For electrochemichromic solutions, temperatures of about 40° C. to about 80° C. range are useful.

When in gel, or semi-solid, form, the media 6 may be dispensed onto the substrate 2 having the trimmed thermoplastic material 5c thereon by heaping it up at the center part of the interior face of the substrate 2 so that it may be readily spread thereover once pressure is applied thereto by the substrate 3. The media 6 may be dispensed onto the substrate 2 in such a manner without accurately pre-measuring it because, when assembled, the substrates 2,3 displace any excess media therefrom. For a further description of dispensing techniques, see U.S. Pat. No. 4,761,061 (Nishiyama).

With regard to an electrochemichromic device, many preparations of electrochemichromic solutions which are to be dispensed into that device are available [see, e.g. U.S. Pat. Nos. 3,280,701 (Donnelly), 3,451,741 (Manos), 3,806,229 (Schoot) and 4,902,108 (Byker), and commonly assigned U.S. Pat. Nos. 5,140,455 (Varaprasad), 5,142,407 (Varaprasad) and 5,151,816 (Varaprasad), 07/458,969 (filed Dec. 29, 1989) and ELECTROCHEMICHROMIC SOLUTIONS, PROCESSES FOR PREPARING AND USING THE SAME, AND DEVICES MANUFACTURED WITH THE SAME (filed in the United States Patent and Trademark Office on Sept. 6, 1991 under Ser. No. 07/756,342 ]. But, generally, an electrochemichromic solution should be comprised of an anodic compound, a cathodic compound and a solvent.

Electrolytic materials may also be used in connection with the media of electrochromic devices or solutions of electrochemichromic devices and are typically chosen from those conventionally known in the art [see, e.g. U.S. Pat. No. 3,451,741 (Manos)]. The material used to thicken or gelatinize the electrolytic material-containing media may also be chosen from conventionally used materials known in the art. Moreover, the media may also contain an ultraviolet stabilizing agent in order to increase the stability of the media to ultraviolet radiation. Organic solvents, which are capable of self-screening for ultraviolet radiation, may also be employed to accomplish this result. Suitable ultraviolet stabilizing agents are also well-known in the art.

The solvent of choice for the media should remain inert to sealing means 5 that is employed in the construction of the device. In that regard, suitable solvents may be selected from any known solvent used to prepare electrochemical media or to construct cells to be placed in such devices. Examples of such solvents are acetonitrile, methoxypropionitrile, 3-ethoxypropionitrile, propylene carbonate, tetrahydrofuran, $\gamma$-butyrolactone, methylethyl ketone, N,N'-dimethylformamide, butyl alcohol, cyanoethyl sucrose, 3-hydroxypropionitrile, 3,3'-oxydipropionitrile, 2-acetylbutyrolactone, 2-methylglutaronitrile, 3-methylsulfolane, cyclopentanone, cyclohexanone, benzoyl acetone, 4-hydroxy-4-methyl-2-pentanone, acetophenone, 2-methoxyethyl ether, triethylene glycol dimethyl ether and any combination thereof. Such solvents are further conveniently recited in U.S. Pat. No. 3,806,229 (Schoot), and commonly assigned copending U.S. patent applications Ser. Nos. 07/443,113 (filed Nov. 29, 1989), 07/456,164 (filed Dec. 22, 1989) and 07/458,969 (filed Dec. 29, 1989).

After filling the cell cavity, the assembly (see FIG. 4E) may be held intact by a moderate pressure—e.g., by clamping. Typically, moderate pressure of about 5 PSI up to about 500 PSI, at the softening temperature, should establish sealing means 5. Preferably, a pressure of about 100 PSI to about 200 PSI should be applied thereto. Whatever heat and pressure is applied to the assembly to establish the sealing means 5 should be applied uniformly to substrates 2,3. The use of an autoclave, such as that conventionally used in laminated safety glass manufacture, is often useful in connection herewith.

Once pressure is applied to the assembly, it may then be fired, or one or more peripheral areas of the assembly may be selectively fired, until the temperature at which the thermoplastic material softens is reached (discussed supra). The assembly may be heated in a vacuum chamber in the presence of an inert gas—e.g., argon, nitrogen and the like—to minimize the possibility of oxidation of any of the constituents of the media.

The sealing means 5, which is created at substantially the same time as the media 6, is dispensed into the cell cavity which is hermetically enclosed within and is fully integral therearound with no gaps, fill holes or plugs for fill holes. And, by its position in intimate contact with the media 6 and the optional presence of an inert atmosphere, the sealing means 5 prevents, to a large degree, gaseous contaminants, such as oxygen, from coming into contact with the media 6. An additional outer seal may be optionally employed therewith to enhance the mechanical property of the joint—i.e., the sealing means 5—of the device.

An adjacent surface may also be affixed to the device after complete assembly. To that end, it is preferred that at least one of the substrates 2,3 be of a laminate assembly comprising at least two transparent panels affixed to one another by a substantially transparent adhesive material. This laminate assembly assists in reducing the scattering of glass shards from the substrate should the assembly break due to impact.

In order to operate the electrochromic device once assembled, an applied potential need be introduced so that coloring may be observed in the device. A source of applied potential may be connected to an electrochromic cell by leads of electrically conducting strips known in the art as "bus bars". The bus bars 8 may be constructed of copper, aluminum, silver or the like and should be affixed to the conductive coatings 4 that are found as thin films set out on the interior face of each of the substrates 2,3 that comprise the cell. Since these substrates 2,3 are located in spaced-apart relationship to one another and are also displaced in opposite directions relative to one another (discussed supra), an exposed portion of the conductive coating 4 is provided for the bus bars 8 to adhere to.

The methods for sealing described in the present invention may be advantageously employed to manufacture devices using electrochromic cells, such as, mirrors—e.g., vehicular, architectural or specialty mirrors for use in periscopic or dental applications—, windows—e.g., architectural or vehicular glazings like sun roofs, sun visors or shade bands—, information displays, optically attenuating contrast filters, privacy or security partitions, lenses and the like.

Thus, in the context of a mirror assembly, a reflective coating 7, having a thickness in the range of about 250 Å to about 2000 Å, preferably about 1000 Å, should be applied to the exterior face of one of the substrates 3. Suitable materials for this coating are aluminum, palladium, platinum, titanium, chromium, silver and stainless steel, with silver being preferred. This reflective coating 7 serves to assist in reflecting incident light. It is clear from the teaching herein that in the context of a window assembly, a sun roof assembly or the like, reflective coating 7 need only be omitted from the assembly so that the light is permitted to transmit through the transparent panel.

It is also contemplated by the instant teaching that designer panels may be constructed in accordance herewith. For instance, a designer window or mirror, or a display panel, bearing a decorative insignia or signature may be constructed by preparing such from the thermoplastic material used for the sealing means 5 and positioning the decorative insignia or signature onto the first substrate into its desired position just prior to dispensing the media 6 thereon. Thus, when the method is complete, a designer window or mirror, or a display panel, will have been constructed.

In addition, once constructed, the device—e.g., a mirror assembly—may have a molded casing placed therearound. This molded casing may be pre-formed or injection molded using conventional techniques, including injection molding of thermoplastic materials, such as polyvinyl chloride, or reaction injection molding of thermosetting materials, such as polyurethane. These techniques are well-known in the art [see, e.g. U.S. Pat. Nos. 4,139,234 (Morgan) and 4,561,625 (Weaver), respectively, for these techniques in the context of modular window encapsulation].

Each of the documents cited in the present teaching are herein incorporated by reference to the same extent as if each document had individually been incorporated by reference.

It is thus evident in view of the above description of the instant invention that a wide range of practical opportunities is provided by the teaching herein. The following example is provided for illustrative purposes only and is not to be construed so as to limit in any way the teaching of the present invention.

EXAMPLE

In order to construct an electrochromic mirror, we obtained two ITO-coated glass substrates measuring about 15 cm×40 cm and having a sheet resistance of about 6 to about 8 ohms per square [commercially available from Donnelly Corporation, Holland, Michigan]. One of these ITO-coated substrates was reflector coated on its rear-most surface with a silver mirror coating. We placed this first ITO-coated glass substrate on a work surface, having its ITO-coated face upward, under a substantially inert atmosphere and then positioned a sheet of thermoplastic material, constructed from plasticized polyvinyl butyral, thereover [commercially available under the trade name "SAFLEX SR" from Monsanto Co., St. Louis, Missouri]. The plasticized polyvinyl butyral sheet had dimensions greater than those of the first substrate and was about 380 μm in thickness.

We next carefully trimmed the plasticized polyvinyl butyral sheet to a dimension that was no greater than that of the first substrate on which it was placed. We thereafter trimmed an inner portion of the polyvinyl butyral sheet so that only a border of about 15 mm remained toward the peripheral edge of the first substrate. The trimmed polyvinyl butyral sheet taken in conjunction with the interior face of the first substrate on which it was placed constitutes the containing cell cavity (less the top of the cell supplied from the second substrate) in which the media is to be placed.

At ambient temperature, we then dispensed onto the central region of the first substrate about 30 mls of an electrochemichromic solution prepared containing about 0.008 M of ethylviologen perchlorate and about 0.008 M of 5,10-dihydro-5,10-dimethylphenazine, both dissolved in a solvent comprising about 70% 3-hydroxypropionitrile and about 30% glutaronitrile, into the cavity created by the first substrate with the trimmed polyvinyl butyral sheet thereon. The amount of this solution was not accurately measured, because the main concern was that the cavity be entirely filled.

After dispensing the solution, we placed a second substrate downward onto the first substrate having the trimmed polyvinyl butyral sheet thereon, with the substrate's ITO-coated face downward, thereby establishing the cell cavity. We used hand pressure to press the substrates together so that the media displaced and dispersed uniformly throughout the cavity to fill it, without introducing gaseous bubbles. In this manner, any excess media was forced to flood over and under the trimmed polyvinyl butyral sheet to the exterior portions of the cell cavity. The first and second substrates, with the trimmed polyvinyl butyral sheet therebetween, were thus in spaced-apart relationship and were laterally displaced from one another by about 2 mm. This lateral displacement permits the bus bar to be affixed thereto so that an applied potential may be conveniently introduced to the cell.

We next temporarily clamped the two substrates together with the trimmed polyvinyl butyral sheet in order to apply pressure on the assembly so formed. We then applied heat, and further pressure, to this assembly until the trimmed polyvinyl butyral sheet softened and became affixed to the two substrates. We furnished the heat and extra pressure so applied by placing this assembly into an autoclave having a temperature of about 90° C. to about 95° C. After about 45 minutes of this autoclave cycle, we removed the assembly from the autoclave and allowed the assembly to return to ambient temperature whereupon the clamps were removed.

We trimmed a 2 mm strip of polyvinyl butyral found on the exposed portion of the first ITO-coated substrate so as to expose the ITO coating on the peripheral edge of the first substrate. We then attached the bus bars to a portion of the peripheral edges of the two substrates and thereafter encapsulated the assembled device with a thermoplastic material to finish the product device.

Although the foregoing invention has been described in some detail by way of illustration and example for the sake of clarity, it will be clear that changes and modifications may be practiced within the spirit of the claims which define the scope of the present invention. Thus, those of ordinary skill in the art will recognize or readily ascertain using no more than routine experimentation, that equivalents exist to the embodiments of the invention described herein. And, it is intended that such equivalents be encompassed by the claims which follow hereinafter.

What we claim is:

1. A method for sealing an electrochromic device, wherein said method comprises the steps of:

(a) positioning a sealing means onto the interior face of a first substrate towards the peripheral edge thereof;
   (b) dispensing media onto said first substrate having said sealing means positioned thereon;
   (c) positioning a second substrate in spaced-apart relationship with said first substrate so that said sealing means is positioned therebetween and said media is contained within a cavity created thereby;
   (d) displacing said media throughout said cavity and filling said cavity therewith;
   (e) applying pressure to said first substrate and said second substrate such that said first substrate and said second substrate are pressed toward one another; and
   (f) heating the assembly created by steps (a)–(e) such that said sealing means adheres to the interior faces of said first substrate and said second substrates while sealingly containing said media within said cavity.

2. The method according to claim 1, wherein step (a) further comprises affixing said sealing means to said first substrate.

3. The method according to claim 1, wherein said sealing means is constructed of any thermoplastic material that softens at a temperature that is sufficiently high so that said sealing means remains stable and intact in the temperature range said electrochromic device operates but at a temperature insufficient to cause said media to alter its physical composition or chemically degrade.

4. The method according to claim 1, wherein said sealing means is selected from the group consisting of a plasticized polyvinyl butyral, ethylene:organic acid copolymers and salts thereof, ethylene vinyl alcohol, ethylene vinyl acetate, polyolefins, polyesters, polystyrene, polyvinyl chloride, ethylene ethyl acrylate, polyvinylidene chloride, ethylene acrylate, nylon, polycarbonate, polyethylene fluoride, an ionomer resin and any combination thereof.

5. The method according to claim 4, wherein said ethylene:organic acid copolymers are selected from the group consisting of ethylene:methacrylic acid copolymer and salts thereof, ethylene:acrylic acid copolymer and salts thereof and any combination thereof.

6. The method according to claim 4, wherein said sealing means is selected from the group consisting of a plasticized polyvinyl butyral and an ionomer resin.

7. The method according to claim 5, wherein said salts are selected from the group consisting of lithium, sodium, potassium, zinc and any combination thereof.

8. The method according to claim 1, wherein said sealing means further comprises a material selected from the group selected from dyes, pigments, colorants, fillers, opacifying agents and any combination thereof.

9. The method according to claim 1, wherein said first substrate and said second substrate are each constructed from a material selected from the group consisting of glass, optical plastics, laminated glass and tempered glass.

10. The method according to claim 9, wherein said first substrate and second substrate are each constructed of the same material.

11. The method according to claim 9, wherein said first substrate and second substrate are each constructed of different materials.

12. The method according to claim 1, wherein said first substrate and said second substrate are substantially planar and positioned substantially parallel to and laterally displaced from one another.

13. The method according to claim 1, wherein said first substrate and second substrate are each curved.

14. The method according to claim 1, wherein said sealing means creates a cell gap of about 10 μm to about 1000 μm between said first substrate and said second substrate.

15. The method according to claim 1, wherein said sealing means creates a cell gap of about 50 μm to about 500 μm between said first substrate and said second substrate.

16. The method according to claim 1, wherein said first substrate and said second substrate are each coated on their interior surface with a conductive coating.

17. The method according to claim 16, wherein an electrochromic working electrode is set forth over said conductive coating of said first substrate thereby contacting said media once dispensed.

18. The method according to claim 17, wherein an electrochromic counter electrode is set forth over said conductive coating of said second substrate thereby contacting said media once dispensed.

19. The method according to claim 1, wherein said pressure of (e) is applied in the range of about 100 PSI to about 200 PSI.

20. The method according to claim 1, wherein said assembly of (f) is heated to a temperature in the range of about 50° C. to about 200° C.

21. The method according to claim 1, wherein said assembly of (f) is heated to a temperature in the range of about 75° C. to about 150° C.

22. The method according to claim 1, wherein said media comprises
(a) an anodic compound capable of influencing a color change in said device upon the introduction of an applied potential;
(b) an cathodic compound capable of influencing a color change in said device upon the introduction of an applied potential; and
(c) a solvent.

23. The method according to claim 22, wherein said anodic compound and said cathodic compound influence a color change in said media.

24. The method according to claim 22, wherein said anodic compound and said cathodic compound influence a color change in said electrode coatings.

25. The method according to claim 22, wherein said media further comprises a constituent selected from the group consisting of an electrolytic material, ultraviolet stabilizing agent and any combination thereof.

26. The method according to claim 25, wherein said constituent is an electrolytic material.

27. The method according to claim 25, wherein said constituent is an ultraviolet stabilizing agent.

28. The method according to claim 24, wherein said solvent of (c) is selected from the group consisting of acetonitrile, methoxypropionitrile, 3-ethoxypropionitrile, propylene carbonate, tetrahydrofuran, γ-butyrolactone, methylethyl ketone, N,N'-dimethylformamide, butyl alcohol, cyanoethyl sucrose, 3-hydroxypropionitrile, 3,3'-oxydipropionitrile, 2-acetylbutyrolactone, 2-methylglutaronitrile, 3-methylsulfolane, cyclopentanone, cyclohexanone, benzoyl acetone, 4-hydroxy-4-methyl-2-pentanone, acetophenone, 2-methyloxyethyl ether, triethylene glycol dimethyl ether and any combination thereof.

29. The method according to claim 1, wherein said media is in a physical form selected from the group consisting of a liquid, a gel and a semi-solid.

30. The method according to claim 29, wherein said media is a liquid.

31. The method according to claim 29, wherein said media is a gel.

32. The method according to claim 29, wherein said media is a semi-solid.

33. A method for using a thermoplastic sealing material to manufacture an electrochromic device, said method comprising the steps of:
(a) positioning strips of a thermoplastic material toward the periphery of the face of a first substrate;
(b) dispensing media onto said first substrate having said thermoplastic strips positioned thereon;
(c) positioning a second substrate in spaced-apart relationship to said first substrate whereby said thermoplastic strips are integrally positioned therebetween and said media is contained within a cavity related thereby;
(d) displacing said media throughout said cavity and filling said cavity therewith;
(e) applying pressure onto said first substrate and said second substrate such that said first substrate and said second substrate are pressed toward one another; and
(f) heating the assembly created by steps (a)-(e) such that said sealing means adheres to said first substrate and said second substrate while sealingly containing said media within said cavity contained within said device.

34. A method for using a thermoplastic sealing material to manufacture an electrochromic device, said method comprising the steps of:
(a) positioning a sheet of thermoplastic material onto a first substrate;
(b) trimming said sheet of thermoplastic material to substantially the same length and width as said first substrate;
(c) trimming the interior portion of said sheet of thermoplastic material so that a border of said sheet of thermoplastic material remains at the peripheral edges of said first substrate;
(d) dispensing media onto said first substrate having said trimmed sheet of thermoplastic material positioned thereon;
(e) positioning a second substrate in spaced-apart relationship to said first substrate whereby said trimmed sheet of thermoplastic material is positioned therebetween and said media is contained within a cavity created thereby;
(f) displacing said media throughout said cavity and filling said cavity therewith;
(g) applying pressure onto said first substrate and said second substrate such that said first substrate and said second substrate are pressed toward one another; and
(h) heating the assembly created by steps (a)-(g) such that said sealing means adheres to said first substrate and said second substrate while sealingly containing said media within said cavity contained within said device.

35. The method according to claim 34, wherein said sheet of thermoplastic material is constructed of any thermoplastic material that softens under a pressure that is applied thereto at a temperature that is sufficiently high so that said sealing means remains stable and intact in the temperature range said electrochromic device operates but at a temperature that is insufficient to cause said media to alter its physical composition or chemically degrade.

36. A device manufactured by the method according to claims 1, 33 or 34.

37. A device manufactured by the method according to claims 2–32 or 35.

38. The device according to claim 36, wherein said device is a window assembly.

39. The device according to claim 37, wherein said device is a window assembly.

40. The device according to claim 36, wherein said device is a sun roof assembly.

41. The device according to claim 37, wherein said device is a sun roof assembly.

42. The device according to claim 36, wherein said device is a mirror assembly further comprising a reflective coating on a face of either said first substrate or said second substrate.

43. The device according to claim 37, wherein said device is a mirror assembly further comprising a reflective coating on a face of either said first substrate or said second substrate.

44. The device according to claim 42, wherein said reflective coating is constructed from a material selected from the group consisting of aluminum, silver, platinum and stainless steel.

45. The device according to claim 43, wherein said reflective coating is constructed from a material selected from the group consisting of aluminum, silver, platinum and stainless steel.

* * * * *

UNITED STATES PATENT AND TRADEMARK OFFICE
CERTIFICATE OF CORRECTION

PATENT NO. : 5,233,461
DATED : August 3, 1993
INVENTOR(S) : CRAIG A. DORNAN ET AL.

It is certified that error appears in the above-identified patent and that said Letters Patent is hereby corrected as shown below:

COLUMN 4

Line 20, "large" should read --a large--.

COLUMN 5

Line 57, "directions" should read --directions,--.

COLUMN 10

",07/458,969 (filed Dec. 29, 1989)" should be deleted.

COLUMN 14

Line 18, "substrates" should read --substrate--.

COLUMN 15

Line 34, "comprises" should read --comprises:--.
Line 38, "an" should read --a--.

Signed and Sealed this

Fifteenth Day of November, 1994

Attest:

BRUCE LEHMAN

*Attesting Officer*     *Commissioner of Patents and Trademarks*